Feb. 26, 1952   H. E. VAN VALKENBURG ET AL   2,587,414
ULTRASONIC MATERIALS TESTING
Filed Aug. 13, 1949

Inventors:
Howard E. Van Valkenburg,
Moe S. Wasserman,
by  *Paul A. Frank*
Their Attorney.

Patented Feb. 26, 1952

2,587,414

UNITED STATES PATENT OFFICE 2,587,414

ULTRASONIC MATERIALS TESTING

Howard E. Van Valkenburg and Moe S. Wasserman, Schenectady, N. Y., assignors to General Electric Company, a corporation of New York Application August 13, 1949, Serial No. 110,115

2 Claims. (Cl. 73—67)

This invention relates to the ultrasonic testing of materials, and more particularly to a method and equipment for the detection of flaws in right-angled bonds or welds.

One of the methods of testing materials presently in use utilizes variations in the transmission of ultrasonic waves in a material as a means for detecting flaws occurring therein. Various commercial equipments available for carrying out this method generally comprise an ultrasonic generator provided with a suitable transducer, and an ultrasonic receiver provided with a similar transducer. It has been the practice to provide both generator and receiver with similar transducers, which produce or respond to waves of one mode only in the materials being tested. One type of ultrasonic materials tester presently on the market is provided with transducers containing X-cut quartz crystals which respond to longitudinal waves. In operation, the transducers are located on either side of the area being tested, and respond to longitudinal waves propagating through this area. This requires that the transducers be located in parallel planes. This requirement is at times impossible of meeting because of the structure of the material being tested. For instance in a right-angled weld, it may not be possible to locate one transducer so as to respond to a longitudinal wave in one of the sections.

Accordingly, it is an object of our invention to provide an improved ultrasonic method of testing materials suitable for the detection of flaws in right-angled welds.

Another object of our invention is to provide an ultrasonic method of detecting flaws suitable for use where it is not practical to locate a receiving element such that it can respond to the mode of the ultrasonic waves provided by the generating element.

A further object of our invention is to provide apparatus suitable for the detection of flaws in right-angled welds in accordance with our method.

For further objects and advantages and for a better understanding of our invention, attention is now directed to the following description and accompanying drawings. The features of our invention believed to be novel will be more particularly pointed out in the appended claims.

Our invention is based on the principle that it is possible for a transducer to respond to components of a wave in a different mode than the mode in which the wave was originally produced. Thus a Y-cut quartz crystal may be utilized to generate a shear wave in which the particle motion is perpendicular to the direction of propagation of the wave. Such a wave would normally be received by means of a similar Y-cut quartz crystal which would also respond to a shear wave. The receiving crystal in such case would be located in a plane parallel to that of the sending crystal. We have found that it is possible to use an X-cut quartz crystal for responding to a component of a shear wave. An X-cut quartz crystal normally operates in conjunction with a longitudinal wave in which the particle motion is parallel to the direction of propagation; when utilized to detect a shear wave, the X-cut crystal is located in a plane perpendicular to that of the Y-cut crystal, and it then responds to the component of particle motion in the shear wave which is perpendicular to the direction of propagation. This principle makes it possible to locate generating and receiving crystals in mutually perpendicular planes, and thus provides a method ideally suited to the detection of flows in right-angled welds.

Figure 1:
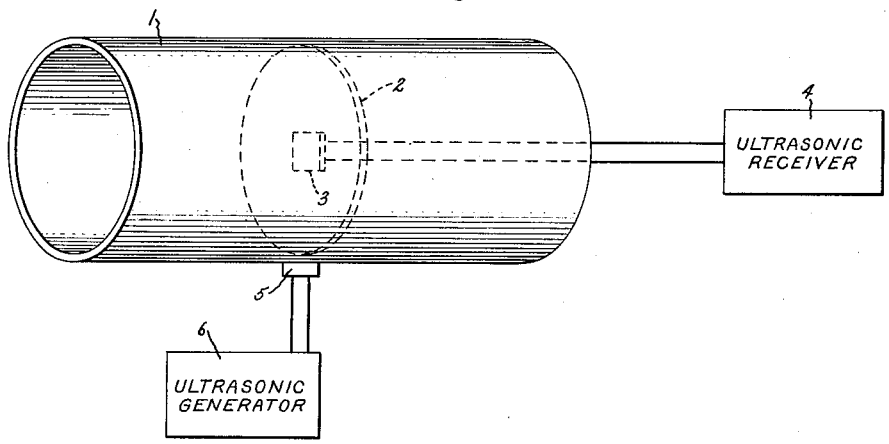
Fig. 1 is a pictorial illustration of a welded steel structure, shown for the purpose of demonstrating the application of our method to the detection of flaws in right-angled welds.

Referring to Fig. 1, there is shown a cylindrical steel shell 1 which may, for instance, be a section of a boiler. A circular plate 2 is welded inside shell 1 and may, in practice, be a bottom plate. It is desired to test the welded areas at the junction of plate 2 with shell 1. Accordingly, a transducer 3 containing an X-cut quartz crystal is located at the center of plate 2. Transducer 3 is connected to an ultrasonic receiver 4, which may be of any one of the types commercially available. A transducer 5, containing a Y-cut quartz crystal, is located on the periphery of shell 1 at the location of the weld with plate 2. Transducer 5 is connected to an ultrasonic generator 6, which may also be of a commercially available type.

Figure 2:
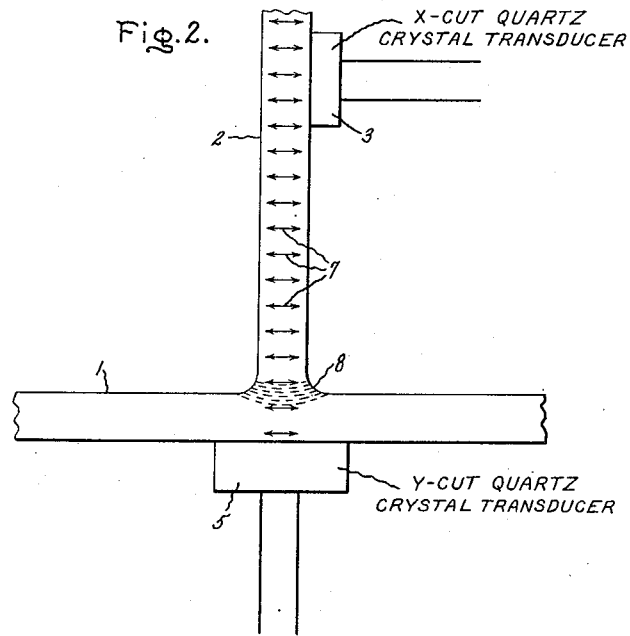
Fig. 2 is a cross-sectional view of the welded structure illustrating the mode of wave propagation therein.

In operation, transducer 5 is moved slowly around the periphery of shell 1 at the weld area, generator 6 meanwhile providing ultrasonic oscillations which are transmitted as a shear wave by transducer 5. Referring to Fig. 2, the arrows 7 illustrate the component of particle motion in a shear wave at right angles to the direction of propagation. The shear waves enter shell 1, pass through the welded area 8 and continue into plate 2. The shear waves arriving at transducer 3 have a component of particle motion corresponding to a longitudinal wave. Accordingly, the X-cut quartz crystal in transducer 3 responds to the wave motion, and the signal is picked up by the receiver 4 and recorded.

In practical testing, the transducer 5 is moved slowly around the periphery of shell 1 and the intensity of the waves received at transducer 3 then provides an indication of the transmission characteristics through the weld area where transducer 5 is presently located. These variations in transmission may be interpreted by a skilled operator to provide information on the character of the weld. A poor weld or a crack would result in very poor transmission and a greatly reduced amplitude of the signal at receiver 4.

While we have shown but one application of our method, it will be quite evident to those skilled in the art that it may be applied with many variations. Thus, it may be used to measure the character of a bond in any material which is capable of transmitting compressional and shear waves. For instance, it may be utilized to measure soldered bonds in metal, or glued bonds in woods or plastics. Many other applications will occur to those skilled in the art. The appended claims are therefore intended to cover any such modifications which fall within the true spirit and scope of the invention.

What we claim as new and desire to secure by Letters Patent of the United States is:

1. The method of testing a bond between two materials wherein the available surfaces for generating and measuring waves in said materials are substantially perpendicular, which comprises generating a shear wave in one of said materials by placing an ultrasonic transmitter which transmits shear waves upon a surface of such material opposite said bond and measuring the component of particle motion corresponding to a longitudinal wave in said other material by placing an ultrasonic receiver which responds to longitudinal waves upon a surface of such other material, the respective surfaces upon which said receiver and said transmitter are placed being substantially perpendicular to each other.

2. Apparatus for testing a right-angled bond between a pair of materials wherein the available surfaces for generating and measuring waves on either side of said bond are substantially perpendicular, comprising a wave generator provided with a Y-cut crystal transducer for producing shear waves in one of said materials and a wave receiver provided with an X-cut crystal transducer for responding to a particle motion corresponding to a longitudinal wave in said other material.

HOWARD E. VAN VALKENBURG.
MOE S. WASSERMAN.

REFERENCES CITED

The following references are of record in the file of this patent:

UNITED STATES PATENTS

| Number | Name | Date |
| --- | --- | --- |
| 2,439,130 | Firestone | Apr. 6, 1948 |

FOREIGN PATENTS

| Number | Country | Date |
| --- | --- | --- |
| 615,578 | Great Britain | Jan. 7, 1949 |
| 615,684 | Great Britain | Jan. 10, 1949 |